(12) United States Patent
Nishihara et al.

(10) Patent No.: US 8,897,372 B2
(45) Date of Patent: Nov. 25, 2014

(54) TASK ALLOCATION DEVICE, TASK ALLOCATION METHOD, AND STORAGE MEDIUM STORING TASK ALLOCATION PROGRAM

(75) Inventors: Kosuke Nishihara, Tokyo (JP); Kazuhisa Ishizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 355 days.

(21) Appl. No.: 13/201,150

(22) PCT Filed: Jan. 22, 2010

(86) PCT No.: PCT/JP2010/000367
§ 371 (c)(1),
(2), (4) Date: Aug. 11, 2011

(87) PCT Pub. No.: WO2010/095358
PCT Pub. Date: Aug. 26, 2010

(65) Prior Publication Data
US 2011/0310977 A1    Dec. 22, 2011

(30) Foreign Application Priority Data
Feb. 18, 2009    (JP) ................................ 2009-035075

(51) Int. Cl.
*G06F 9/46*    (2006.01)
*H04N 7/26*    (2006.01)
*G06F 9/50*    (2006.01)
*G06F 9/48*    (2006.01)

(52) U.S. Cl.
CPC ............ *G06F 9/5027* (2013.01); *G06F 9/4881* (2013.01)

USPC ................ 375/240.24; 375/E7.075; 718/102; 718/106

(58) Field of Classification Search
None
See application file for complete search history.

(56) References Cited

U.S. PATENT DOCUMENTS

| | | | |
|---|---|---|---|
| 7,614,053 B2 | 11/2009 | Inoue et al. | |
| 2007/0024919 A1* | 2/2007 | Wong et al. | 358/403 |
| 2007/0283337 A1 | 12/2007 | Kasahara et al. | |
| 2008/0310555 A1* | 12/2008 | Kee | 375/340 |
| 2009/0070772 A1* | 3/2009 | Shikano | 718/106 |

FOREIGN PATENT DOCUMENTS

| | | |
|---|---|---|
| JP | 11-102349 A | 4/1999 |
| JP | 2005-235228 A | 9/2005 |
| JP | 2005-327007 A | 11/2005 |
| JP | 2007-328415 A | 12/2007 |
| JP | 2007-328416 A | 12/2007 |
| JP | 2008-171153 A | 7/2008 |

* cited by examiner

*Primary Examiner* — Nhon Diep
*Assistant Examiner* — Kaitlin A Retallick
(74) *Attorney, Agent, or Firm* — Foley & Lardner LLP

(57) ABSTRACT

To reduce performance degradation due to a high-performance core's waiting for a processing result of a low-performance core in a multi-core processor including a plurality of cores with different running performance, included are a task pool that stores executable tasks for each computational core, a task scheduler, and a reference count analysis module that acquires hint information and a reference count estimation method from a running task and estimates a reference count of a task to be newly inserted into the task pool or a task existing in the task pool based on the specified method. The scheduler performs insertion and acquisition of a task by mainly using performance of the cores and the reference count.

6 Claims, 12 Drawing Sheets

REFERENCE RELATION
OF INTRA PREDICTION

REFERENCE RELATION
OF DEBLOCKING FILTER

TASK ALLOCATION DEVICE, TASK ALLOCATION METHOD, AND STORAGE MEDIUM STORING TASK ALLOCATION PROGRAM

This application is the National Phase of PCT/JP2010/000367, filed Jan. 22, 2010, which claims priority to Japanese Application No. JP 2009-035075, filed Feb. 18, 2009, the disclosures of which are hereby incorporated by reference in their entirety.

TECHNICAL FIELD

The present invention relates to a task allocation device, a task allocation method, and a storage medium storing a task allocation program, in a multi-core processor.

BACKGROUND ART

Embedded systems have become more sophisticated, and concurrent execution of a plurality of applications and execution of high load applications are required. Among the embedded systems, mobile devices such as cellular phones and PND (Portable Navigation Device), particularly, have become more and more sophisticated, and concurrent execution of a plurality of applications such as the playback of video or music, not only a single application such as the original communication function or navigation function, is required. Multimedia processing such as video playback imposes a high computational load, and a high-performance processor is needed.

As a high-performance processor that executes such high load, plural applications, a multi-core processor that integrates a plurality of computational cores is coming into usage. Because the multi-core processor can achieve high performance with low power consumption, it is an essential technology for mobile devices for which battery run time and heat are of issue.

In order to efficiently execute high load, plural applications using the multi-core processor, parallelization of the applications and allocation of computational resources among the applications are necessary. High load applications which cannot be processed by one core need to be processed by a plurality of cores by way of parallelism. Further, in order to effectively use the plurality of cores, optimization as to what amount of computational resources of which core are to be allocated to each application is important. Because the number of running applications and the load on applications vary, the computational resource allocation needs to be performed dynamically during execution.

The parallelization is performed typically using the parallelism library. Some of the parallelism library use threads such as POSIX or Windows (registered trademark), and others are OpenMP, Intel Threading Building Blocks (TBB) and the like. In the thread library such as POSIX or Windows (registered trademark), the division of application processing and the allocation of divided applications to cores are written by a programmer. The allocation is done manually by a programmer, being aware of the number of cores for allocation. On the other hand, in OpenMP or TBB, the division of processing is done by a programmer, whereas the allocation to cores is executed automatically by the library. Therefore, a programmer is not necessarily particularly aware of the number of cores.

In the parallelism library TBB or the like, task parallelism that divides application processing into a plurality of tasks and automatically allocates the divided tasks to cores is done is performed. The task parallelism model includes a task pool that stores executable tasks and a scheduler that allocates tasks to cores. A programmer writes a program that divides application processing into a plurality of tasks which can be executed in parallel and inserts the executable tasks into the task pool. The tasks inserted into the task pool are automatically allocated to cores by the scheduler. When the number of tasks stored in the task pool is greater than the number of cores, load distribution can be achieved easily, which is a feature of the task parallelism.

The task parallelism allows the number of cores to which the allocation is made (the degree of parallelism) to be changed during execution and thereby facilitates the dynamic allocation of computational resources. Because the scheduler of the task parallelism dynamically allocates tasks to cores capable of dynamically processing the tasks in the task pool, the parallelization without depending on the number of cores can be done. Therefore, the degree of parallelism can be easily changed during execution, and the allocation of computational resources can be dynamically changed according to load variation in an application of interest or another application.

The present invention assumes the use of a parallel model in which each core has a task pool (FIG. 10). In this model, a scheduler 121 performs an operation to acquire a task from a task pool and allocate it to a core and an operation to insert a generated task into a task pool. Hereinafter, the two operations, i.e. the allocation of a task to a core and the insertion of a task into a task pool, are referred to as the task allocation. An example of the task allocation operation to a computational core 131 in a task allocation device 100 is described based on FIGS. 11 and 12.

First, the operation to acquire a task from a task pool and allocate it to a core is described based on FIG. 11.

A scheduler 121 checks whether there is a task in a task pool 111 (Step 201).

When there is a task in the task pool 111, the scheduler 121 acquires the task from the task pool 111. For example, the first-inserted task may be acquired first (Step 202).

When there is no task in the task pool 111, the scheduler 121 checks whether there is a task in another task pool 112, ..., and, when there is no task in any task pool, the task allocation ends (Step 203).

When there is a task in another task pool, the scheduler 121 acquires the task from that task pool (Step 204).

The scheduler 121 allocates the acquired task to the computational core 131, and then the process ends (Step 205).

Next, the operation to insert a task into a task pool is described based on FIG. 12. Generation of a task is performed in a running task, and the scheduler 121 is called after the task generation.

The scheduler 121 inserts the new task into the task pool 111 (Step 211). Some multi-core processor has a heterostructure in which cores do not have the processing performance of the same quality and have different performance. The heterostructure viewed from a parallel program includes a structure in which the physical performance of each core is different (Asymmetric Multiple Processor :AMP) (FIG. 13A) and a structure in which the core performance is of the same quality (Symmetric Multiple Processor :SMP), whereas the computational performance allocated to the parallel program differs from core to core (FIG. 13B). Regarding the core 2 in FIG. 13B, the computational performance of 50% may be explicitly allocated to the program, or the computational performance of 50% may be allocated in consequence of the influence of another program operating on the core.

In the multi-core processor having the heterostructure, it is necessary to take the performance of cores and the dependency between tasks into account in the allocation of tasks to cores. This is because, when there is a dependency to refer to a processing result between tasks and if a task which is referred to by many tasks is allocated to a low-performance core, there is a possibility that a high-performance core waits for the end of processing of the task, resulting in a decrease in parallel performance. The number of references made by other tasks is called the reference count, which serves as an index of the dependency between tasks.

Further, in the case where the reference count is decided during execution, the task allocation needs to be performed during execution. In some cases, there is a complex dependence between tasks, such as when whether to generate a task or whether to refer to a processing result of a certain task is decided by condition determination during execution. When the dependency is determined only during execution like this case, the reference count of a task is determined at the point when all tasks which are likely to refer to a processing result of the task are generated.

Patent Document 1 discloses a technique to allocate tasks to cores in a multi-core processor including a plurality of cores with different performance. The technique employs a task-parallel model that includes a plurality of task pools, and the allocation of tasks can be done during execution. A dependency between tasks is set in advance, and the computational load of task processing and the communication cost between tasks are calculated during execution, thereby allocating tasks.

Further, in respect to a heterogeneous multi-processor system, a technique to achieve control according to conditions such as when processing time of a macro task varies during execution by performing task allocation during execution has been proposed as a related art (for example, refer to Patent Document 2).

Further, although a technique to perform scheduling based on the reference count is proposed as a related art, the object of using the reference count is to increase the number of executable tasks by executing a task with a high reference count in advance (for example, refer to Patent Document 3).

CITATION LIST

Patent Literature

[Patent Document 1] Japanese Unexamined Patent Application Publication No. 2007-328415
[Patent Document 2] Japanese Unexamined Patent Application Publication No. 2007-328416
[Patent Document 3] Japanese Unexamined Patent Application Publication No. 2008-171153

SUMMARY OF INVENTION

Technical Problem

However, the related arts including Patent Document 1 have a problem that the optimum task allocation to cores can be done only after the dependency between tasks (the reference count) is determined. As described earlier, when the presence or absence of generating a task or referring to another task varies by condition determination during execution, the reference count of a task is not determined until all related tasks are generated. In this case, it is undeterminable to which task pool a task should be inserted at the time of new task generation and which task should be acquired at the time of task stealing. Therefore, when a task with a high reference count is allocated to a low-performance core, there is a possibility that a high-performance core waits for the end of processing of the task, resulting in a decrease in parallel performance.

Further, although the number of tasks can increase according to the related art of Patent Document 3, it is difficult to avoid that a task with a high reference count is processed by a low-performance processor, taking a long time to end the processing and failing to execute many tasks.

An object of the present invention is to provide a task allocation device, a task allocation method, and a storage medium storing a task allocation program, for performing task allocation with enhanced parallel performance by reducing performance degradation due to a high-performance core's waiting for a processing result of a low-performance core, in a multi-core processor including a plurality of cores with different running performance.

Solution to Problem

According to one aspect of the present invention, there is provided a task allocation device including a task pool that stores executable tasks, a task scheduler that performs insertion of a new task into the task pool and acquisition of a task from the task pool, and a reference count analysis module that calculates a reference count of a task, the reference count indicating a number of other tasks referring to a processing result of the task, wherein the reference count analysis module analyzes the reference count during execution, and the scheduler performs the insertion and the acquisition of a task based on the reference count. The reference count analysis module may acquire hint information and a reference count estimation method from a running task and estimate the reference count from the hint information based on the specified method.

A task allocation method according to the present invention includes calculating a reference count of a task, the reference count indicating a number of other tasks referring to a processing result of the task acquired from a task pool that stores executable tasks during execution of the task, and performing insertion of a task into the task pool and acquisition of a task from the task pool based on the reference count.

A storage medium storing a task allocation program according to the present invention stores a program that causes a computer to execute processing of calculating a reference count of a task, the reference count indicating a number of other tasks referring to a processing result of the task acquired from a task pool that stores executable tasks during execution of the task, and performing insertion of a task into the task pool and acquisition of a task from the task pool based on the reference count.

Advantageous Effects of Invention

According to the present invention, it is possible to provide a task allocation device, a task allocation method, and a storage medium storing a task allocation program, for performing task allocation with enhanced parallel performance by reducing performance degradation due to a high-performance core's waiting for a processing result of a low-performance core, in a multi-core processor including a plurality of cores with different running performance.

DESCRIPTION OF EMBODIMENTS

First Exemplary Embodiment

Preferred exemplary embodiments of the present invention are described hereinafter with reference to the drawings.

Figure 1:
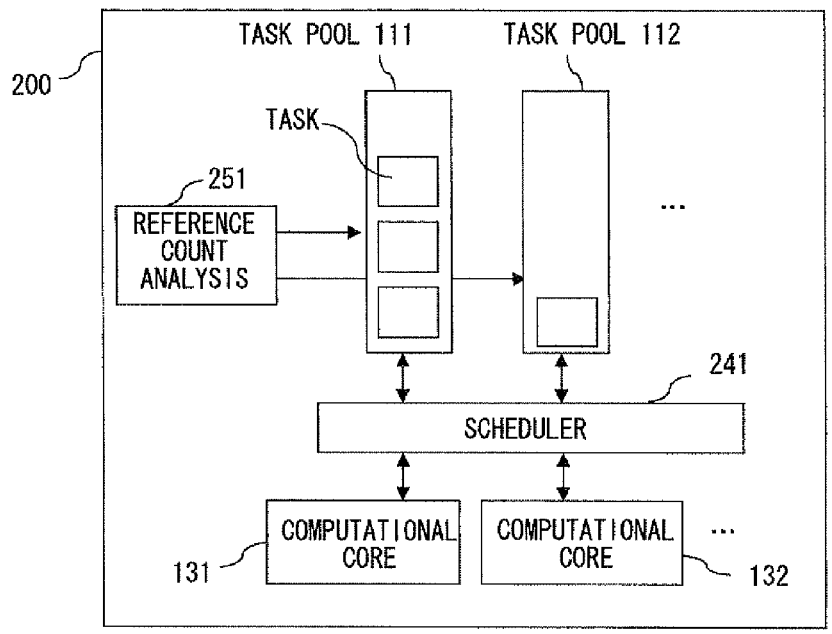
FIG. 1 is a diagram showing a configuration of a task allocation device according to a first exemplary embodiment of the present invention.
Figure 2:
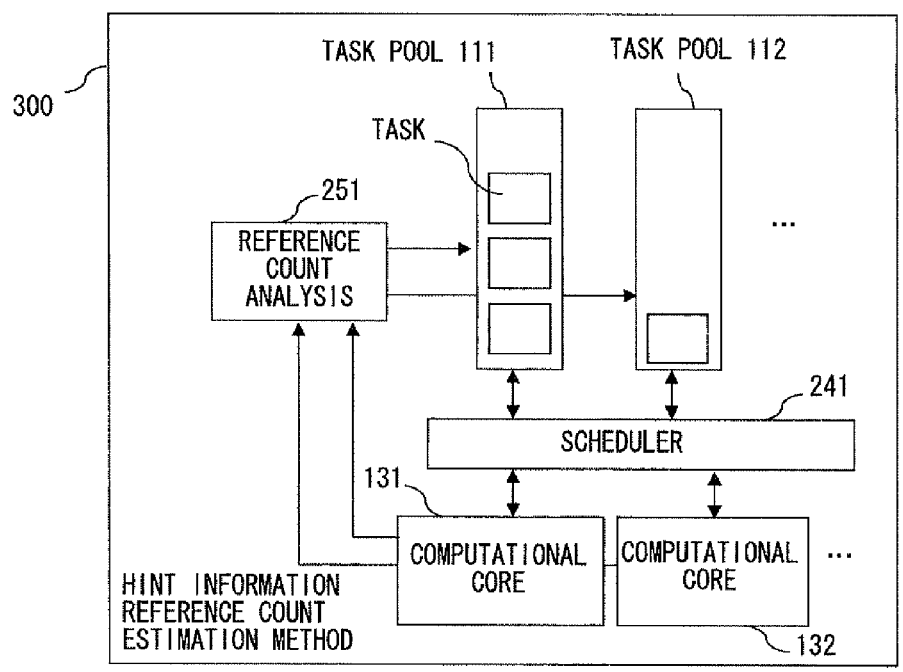
FIG. 2 is a diagram showing a configuration of a task allocation device according to the first exemplary embodiment of the present invention.

FIGS. 1 and 2 show a configuration of a task allocation device according to a first exemplary embodiment. A task allocation device 200 in FIG. 1 includes task pools 111, 112, . . . that store executable tasks for each computational core, a task scheduler 241 that performs insertion of a new task into the task pool and acquisition of a task from the task pool, and a reference count analysis module 251 that calculates a reference count of the task.

The scheduler performs task allocation by mainly using the performance of cores and the reference count.

In the insertion of a new task, a task with a high reference count is inserted into the task pool for a high-performance core, and a task with a low reference count is inserted into the task pool for a low-performance core. Whether the reference count is high or low is determined by setting a threshold and deciding if the threshold is exceeded or not. When the number of computational cores is more than two, a plurality of thresholds are prepared, and the task pool into which the task should be inserted is decided according to the value.

Further, in the task stealing, when the task pool for a low-performance core is empty, a task with a low reference count is acquired from another pool and allocated to the low-performance core, and, when the task pool for a high-performance core is empty, a task with a high reference count is acquired from another pool and allocated to the high-performance core. Like the case of the task insertion, whether the reference count is high or low is determined by setting a threshold for the reference count.

The reference count analysis module analyzes the reference count of a task to be newly inserted into the task pool or a task existing in the task pool during execution. Normally, the reference count of a task is determined at the point when all tasks (related tasks) which are likely to refer to the task are generated. However, it is necessary to make determination before the reference count is decided as to which task pool a task should be inserted at the time of new task generation and as to which task should be acquired at the time of task stealing. Therefore, the module estimates the reference count by analyzing the dependency between tasks in precedence to the normal program progress and associates the estimated reference count with the task. Specifically, the estimation is performed at the time of inserting a task or stealing a task.

The reference count estimation by the reference count analysis module is made on the basis of the task whose reference count is already determined, for example. For example, on the assumption that the reference count tends to be similar between a task to be analyzed and a task of the same type, the reference count of the same-type task may be used as the reference count of the task of interest.

However, the estimation accuracy could not be high enough in the reference count estimation based on the same-type task as described above. Therefore, as shown in a task allocation device 300 of FIG. 2, hint information and a reference count estimation method which are needed for the estimation may be provided from the running task to the reference count analysis module. The reference count analysis module estimates the reference count when the hint information and the reference count estimation method are provided and associates the estimated reference count with the task. Those information may be provided when the running task generates a new task or at the point when the hint information is ready.

For example, type information of a task to be generated and a related task may be acquired as the hint information, and a method that estimates the reference count based on a relation between the types of the task to be generated and the related task may be acquired as the reference count estimation method. Further, a method that precedently performs only the determination on the task generation or a related task or the condition determination on the presence or absence of the task reference may be acquired as the reference count estimation method. By estimating the reference count based on the specified method, the estimation accuracy of the reference count can be improved. The following description is based on the configuration of FIG. 6 in which the reference count analysis module acquires the hint information and the reference count estimation method.

It should be noted that each module shown in FIGS. 1 and 2 is a predetermined functional unit that is implemented by any of software program and hardware in the implementation of the task allocation device according to the exemplary embodiment. Thus, a part or the whole of each processing unit may be implemented as software or hardware.

Figure 3:
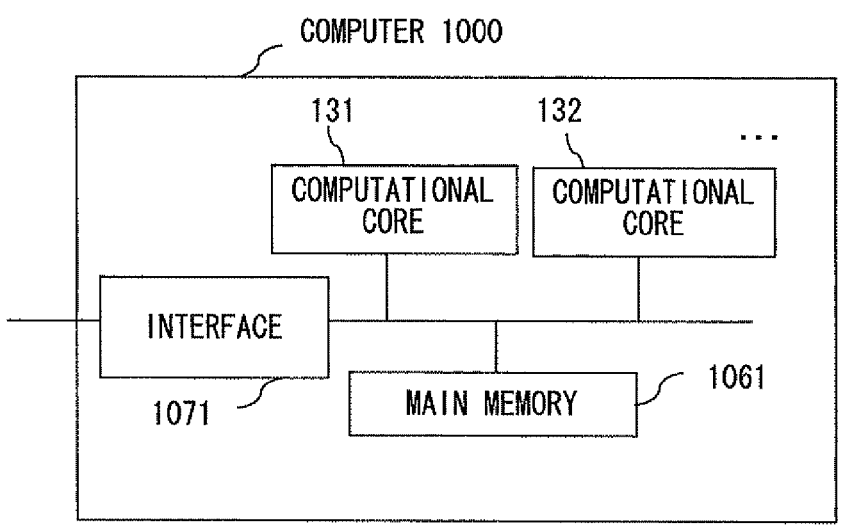
FIG. 3 is a diagram showing a case implemented as a software program.

In the case where it is implemented as a software program, the software program is executed on a computer device 1000 that includes a main memory 1061, computational cores 131, 132, . . . , and an interface unit 1071 as shown in FIG. 3. The software program is stored in the rewritable main memory 1061 (storage medium). The processors 131, 132, . . . read the software program from the main memory 1061 and execute the program. In such a case, the present invention is configured by the software program code or the storage medium.

To be more specific, the processing of each module of the task allocation device is implemented by causing a CPU (Central Processing Unit) to execute a computer program. In this case, the computer program may be provided by being recorded on a recording medium or transmitted through the Internet or other transmission media. The storage media include flexible disk, hard disk, magnetic disk, magneto-optical disk, CD-ROM, DVD, ROM cartridge, RAM memory cartridge with battery backup, flash memory cartridge, and nonvolatile RAM cartridge, for example. Further, the communication media include a wired communication medium such as telephone line and a wireless communication medium such as microwave line, for example.

Figure 4:
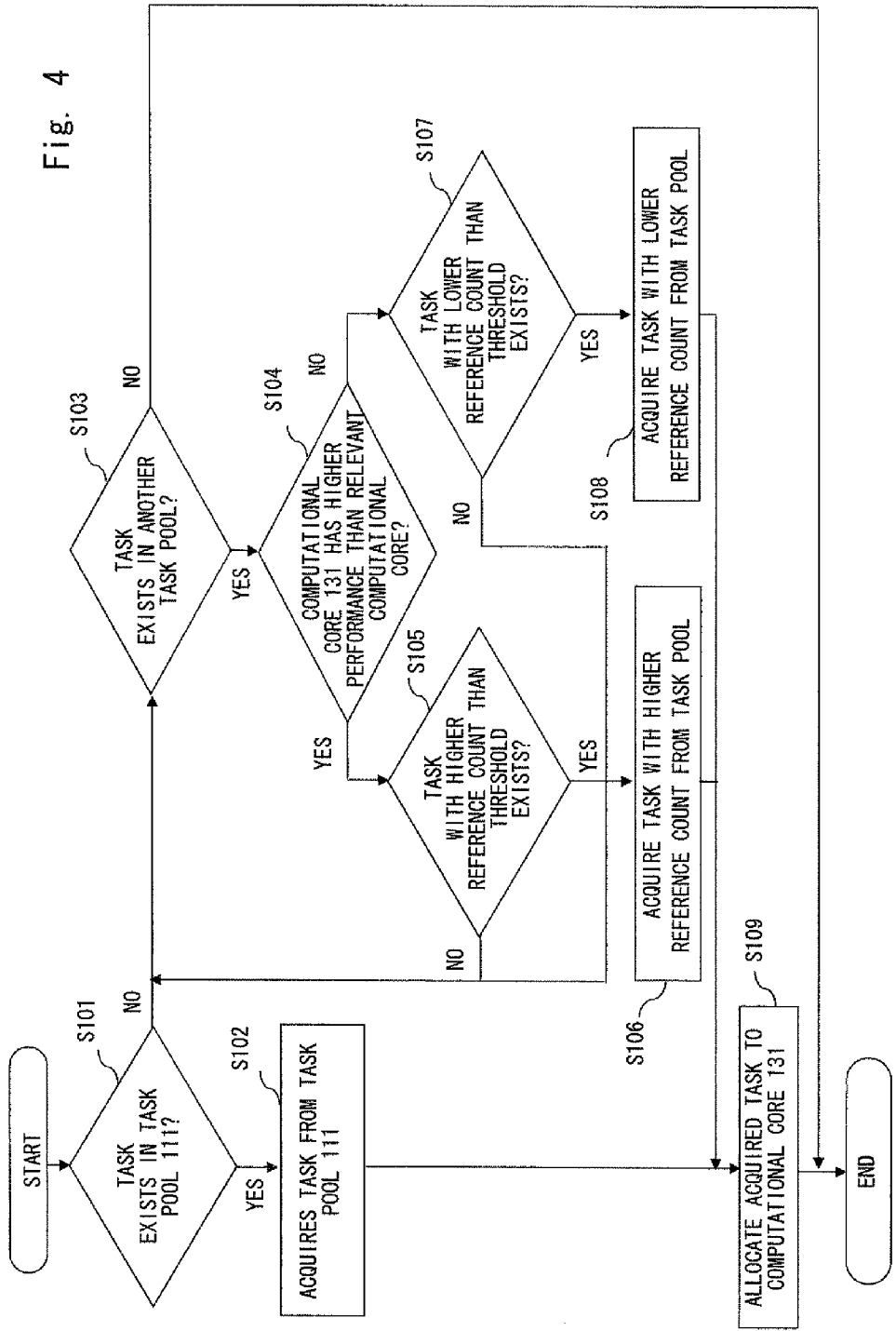
FIG. 4 is a flowchart showing an operation of acquiring a task from a task pool and allocating it to a core.
Figure 5:
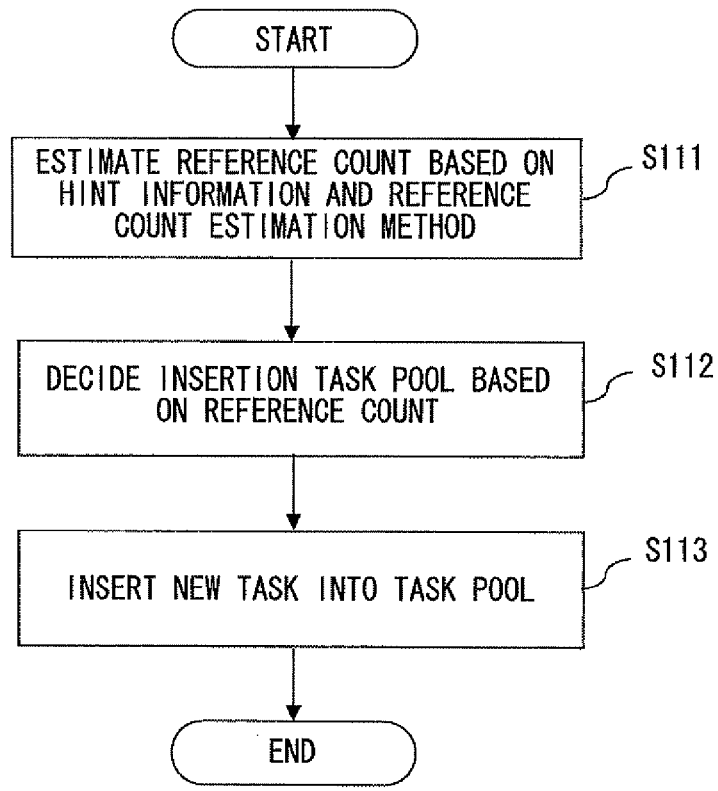
FIG. 5 is a flowchart showing an operation of insertion into a task pool.
Figure 6:
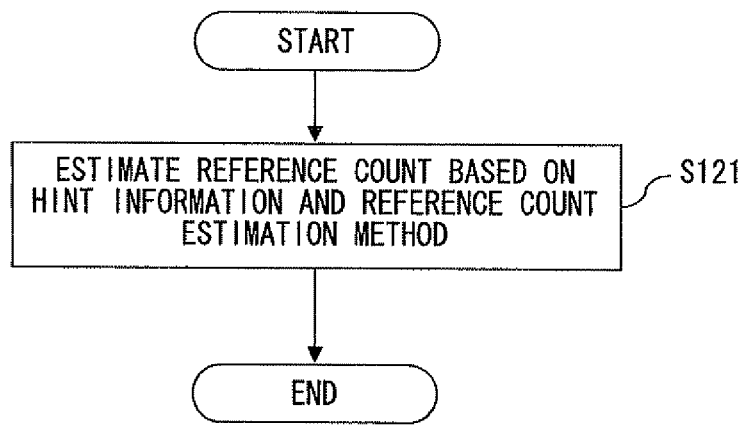
FIG. 6 is a flowchart showing an operation of estimating a reference count.

Hereinafter, an operation procedure according to the first exemplary embodiment is described with reference to FIGS. 4 to 6. FIG. 4 is a flowchart illustrating an operation of acquiring a task from a task pool and allocating it to a core, FIG. 5 is a flowchart illustrating an operation of insertion into a task pool, and FIG. 6 is a flowchart illustrating an operation of estimating a reference count. The flowcharts shown in FIGS. 4 to 6 show the processing procedure of the software program executed by the processors 131, 132, . . . in the computer device 1000 shown in FIG. 3. Thus, the functional module shown in FIG. 2 is described as the software program executed by the processors 131, 132, . . . . The task allocation to the computational core 131 is described as an example hereinbelow.

First, the operation to acquire a task from a task pool and allocate it to a core is described based on FIG. 4.

The scheduler 121 checks whether there is a task in the task pool 111 (Step 101). When there is a task in the task pool 111, the scheduler 121 acquires the task from the task pool 111. For example, the first-inserted task may be acquired first (Step 102).

When there is no task in the task pool 111, the scheduler 121 checks whether there is a task in another task pool which is not yet checked, and, when there is no task in any task pool, the task allocation ends (Step 103).

When there is a task in another task pool, the scheduler 121 compares the performance between a computational core to which the task pool belongs and the computational core 131 (Step 104).

When the computational core 131 has higher performance, the scheduler 121 checks whether there is a task with a higher reference count than a predetermined threshold in the task pool (Step 105). When there is such a task, the scheduler 121 acquires it (Step 106), and when there is no such a task, the process returns to Step 103.

When the computational core 131 has lower performance, the scheduler 121 checks whether there is a task with a lower reference count than a predetermined threshold in the task pool (Step 107). When there is such a task, the scheduler 121 acquires it (Step 108), and when there is no such a task, the process returns to Step 103 in the same manner as above.

The scheduler 121 allocates the acquired task to the computational core 131, and then the process ends (Step 109).

Next, the operation to insert a new task into a task pool is described based on FIG. 5. A case where the hint information and the reference count estimation method are provided at the time of new task generation and the reference count estimation is performed is described below.

The reference count analysis module 251 performs the reference count estimation on the basis of the obtained hint information and reference count estimation method (Step 111).

The scheduler 121 decides a task pool into which a task is to be inserted on the basis of the obtained reference count (Step 112). For example, when the number of computational cores is two, the scheduler 121 selects the task pool for a high-performance core when the reference count is higher than a predetermined threshold, and selects the task pool for a high-performance core when it is lower.

The scheduler 121 inserts the new task into the task pool (Step 113).

Next, the operation to estimate the reference count in other times than when inserting a new task into a task pool is described based on FIG. 6. The operation is started at the point when the hint information is ready in the running task and the running task provides the hint information and the reference count estimation method to the reference count analysis module.

The reference count analysis module 251 performs the reference count estimation on the basis of the obtained hint information and reference count estimation method (Step 121).

By using the provided hint information and reference count estimation method in the above manner, the reference count of a task can be estimated before all related tasks are generated, and the allocation of the task can be thereby done effectively. It is thus possible to reduce wasteful task allocation in which a high-performance core waits for a processing result of a low-performance core and thereby enhance the parallel performance.

A second exemplary embodiment is described hereinafter. In this exemplary embodiment, the first exemplary embodiment is applied to a video processing device. Thus, tasks which are allocated by a task allocation device according to this exemplary embodiment are created by dividing video processing into a plurality of pieces. The following description is provided using an example in which decoding in H.264/MPEG-4 AVC (which is referred to hereinafter as H.264) format is divided in units of macroblocks (MB) as the video processing. Further, parallel processing within a frame is assumed, and parallel processing across frames is not assumed.

The elements according to the second exemplary embodiment is the same as the elements in the task allocation device 300.

The above-described reference count analysis module acquires a bit stream of a MB as the above-described hint information, and acquires a method of decoding only encoding parameters such as a macroblock type, a screen prediction mode and a filter type from the bit stream as the previous reference count estimation method.

The video decoding process performs decoding of the current MB by referring to a processing result of the MB which has been decoded previously. The H.264 video decoding process refers to the previous MB processing result in prediction image generation and deblocking filter. Which MB is to be referred to is decided based on encoding parameters such as a MB type, a screen prediction mode and a filter parameter, which are obtained by a result of variable length decoding (VLD) of the bit stream.

Figure 7A:
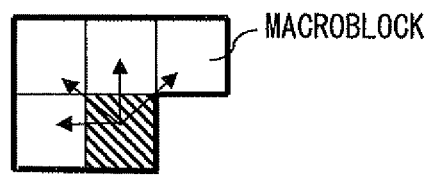
FIG. 7A is an intra prediction diagram.

The prediction image generation is made up of motion compensation or intra prediction, and which processing is to be applied is decided by the MB type for each MB. The motion compensation does not refer to the MB in the same frame. On the other hand, the intra prediction can refer to intra prediction results of the left, upper, upper right and upper left MBs as shown in FIG. 7A. Which MB is to be referred to is decided from the MB type and the screen prediction mode such as intra prediction mode.

Figure 7B:
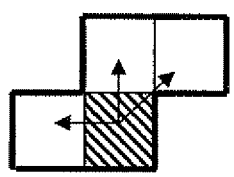
FIG. 7B is an intra prediction diagram when referring to deblocking filter results.

In the deblocking filter, a reference relation is decided by a filter parameter (deblocking_filter_control_present_flag, disable_deblocking_filter_idc etc.). The deblocking filter can refer to deblocking filter results of the left, upper, and upper right MBs (FIG. 7B).

Those encoding parameters are known only during execution. Normally, the VLD is applied to each MB in the predetermined procedure. Thus, the reference relation is unknown until VLD of all related MBs ends, and it is indeterminate by which MB it is referred to at the point of the task generation of the MB processing.

Therefore, a method that performs precedent fast decoding of only encoding parameters that decide the MB reference relation, such as a macroblock type, a screen prediction mode and a filter type, from the bit stream is specified as the previous reference count estimation method. As the hint information, the bit stream of the MB is specified.

Figure 8:
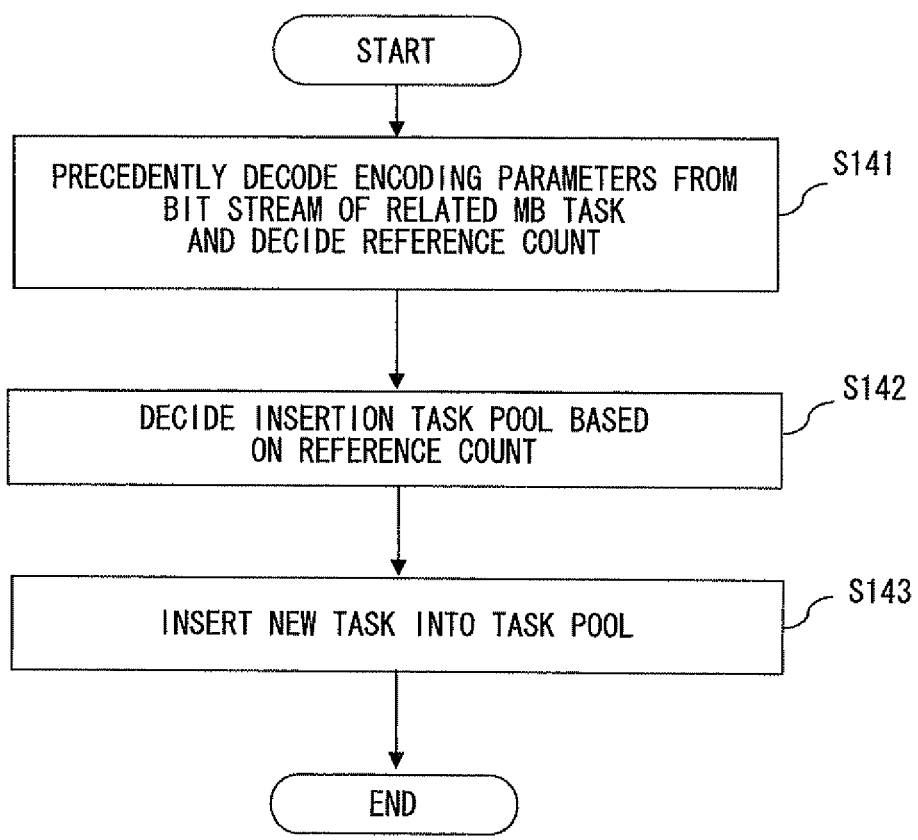
FIG. 8 is a flowchart showing an operation of inserting a new task into a task pool in task allocation of a prediction image generation task.

Next, an operation procedure according to the second exemplary embodiment is described. The flowcharts in the second exemplary embodiment are the same as the flowcharts in the first exemplary embodiment shown in FIGS. 4 to 6. FIG. 8 is a flowchart in which the operation of inserting a new task into a task pool in the task allocation of a prediction image generation task is applied to FIG. 5.

Figure 9A:
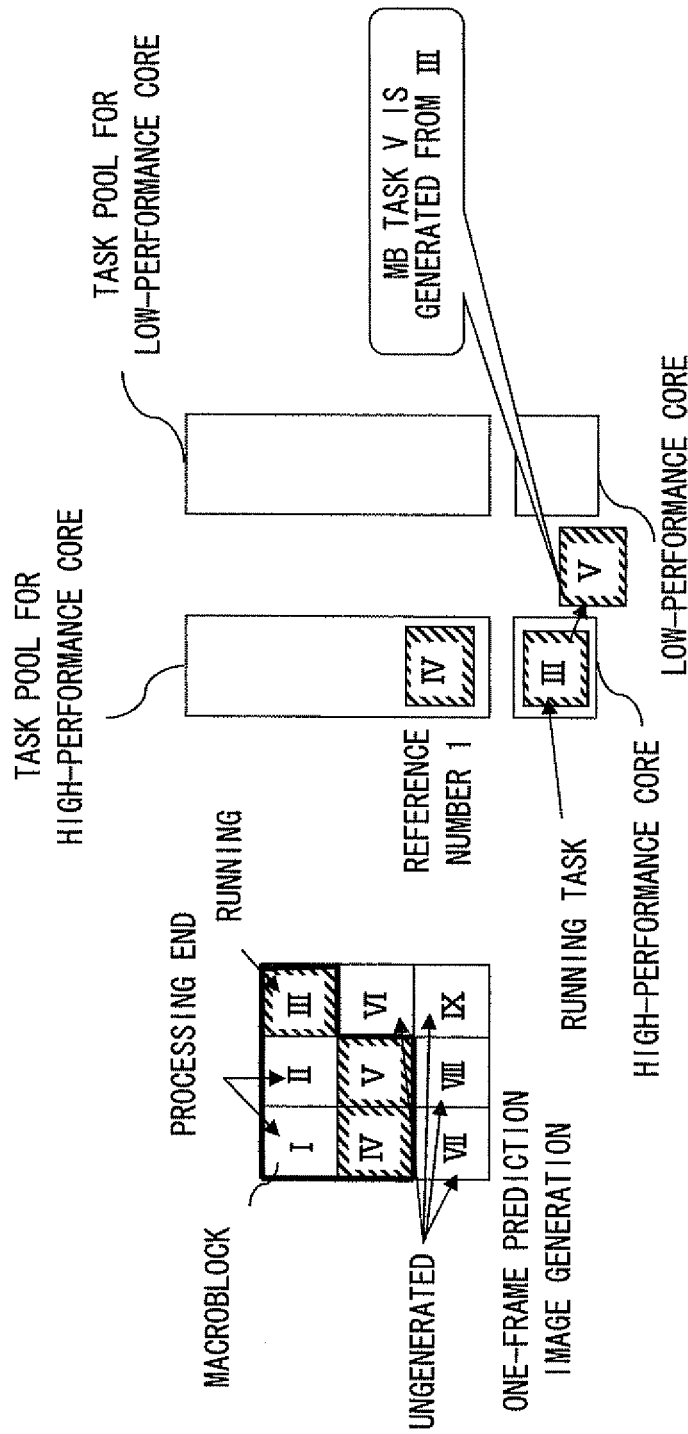
FIG. 9A is a diagram showing an operation of prediction image generation processing applied to one frame.

The operation of inserting a new task into a task pool in the task allocation of a prediction image generation task is described based on FIGS. 8 and 9. FIG. 9 shows an operation of prediction image generation processing which is applied to one frame. FIG. 9A shows the state where processing of the MB tasks I and II ends, the MB task III is running in a high-performance core, the MB task IV is inserted in a task pool for the high-performance core, and the MB task V is generated from the MB task III. Further, the MB tasks VI to IX are not yet generated, and their reference relation is unknown. Hereinafter, the operation of the task allocation of the MB task V is described.

It is assumed that, at the time of generating the MB task V, the MB task III provides a bit stream corresponding to the MB VI to IX as the hint information and a method that performs precedent decoding of the MB type and the intra prediction mode from the bit stream as the reference count estimation method to the reference count analysis module 251.

Figure 9B:
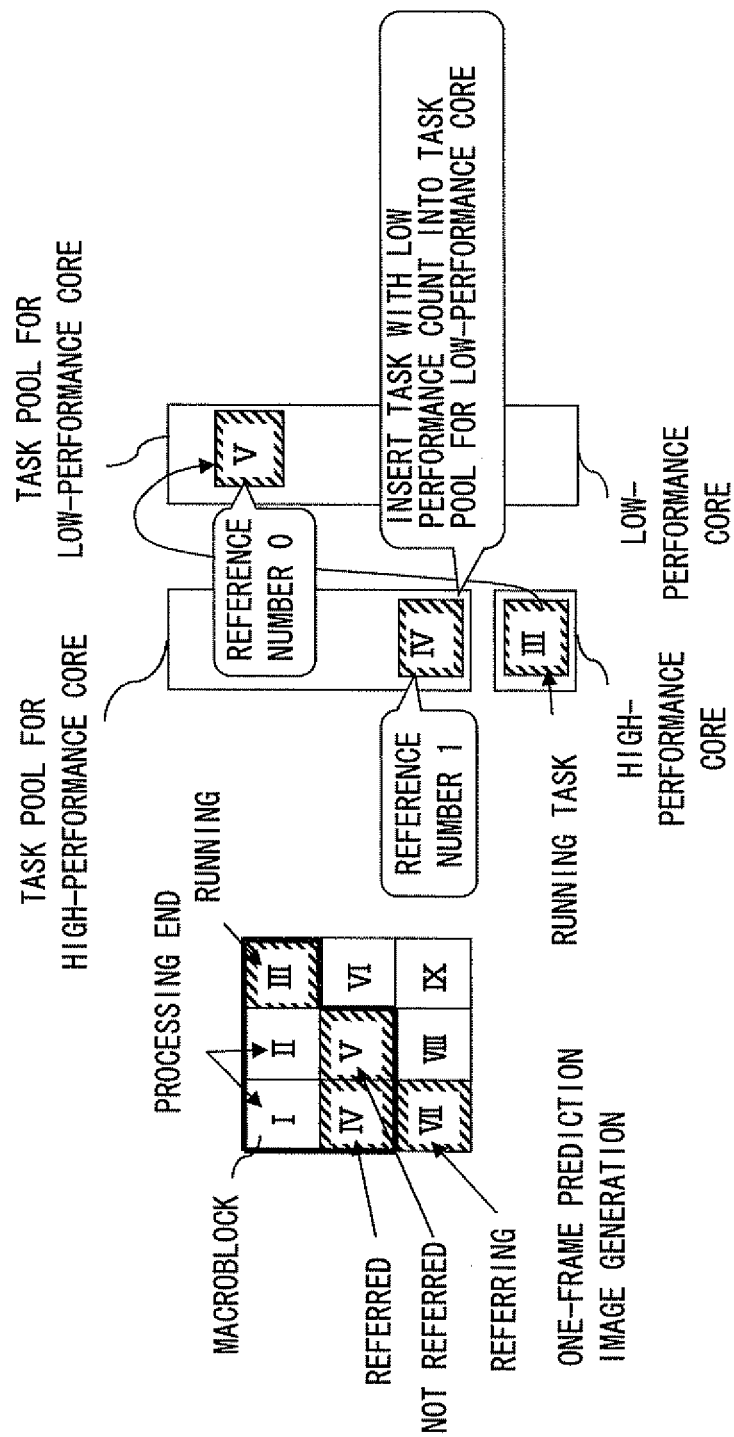
FIG. 9B is a diagram showing an operation of prediction image generation processing applied to one frame.
Figure 10:
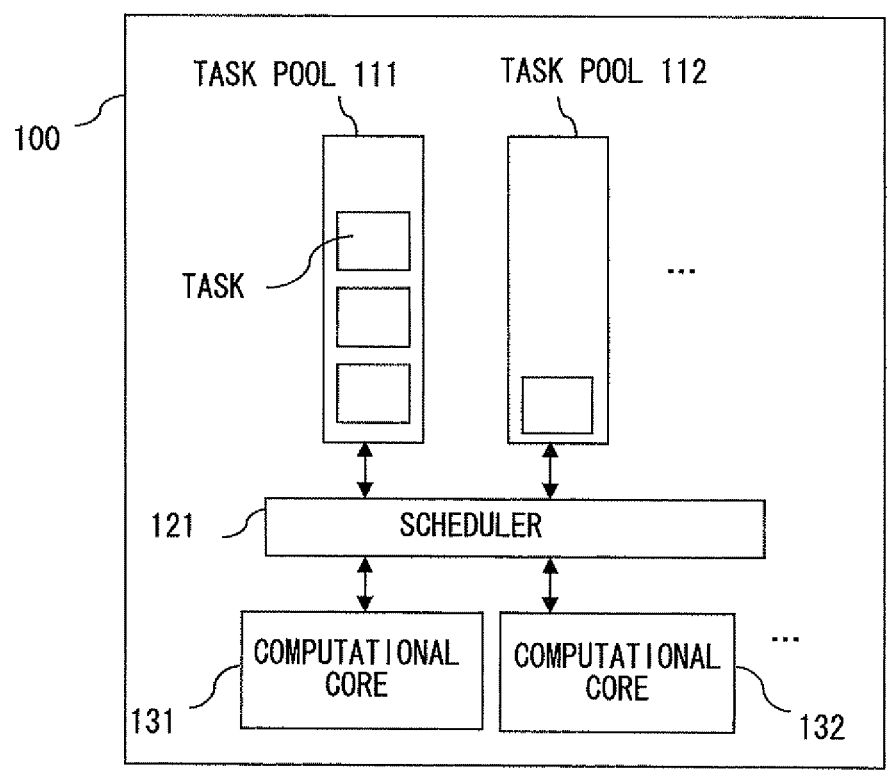
FIG. 10 is a diagram showing a multi-parallel model in which each core has a task pool.
Figure 11:
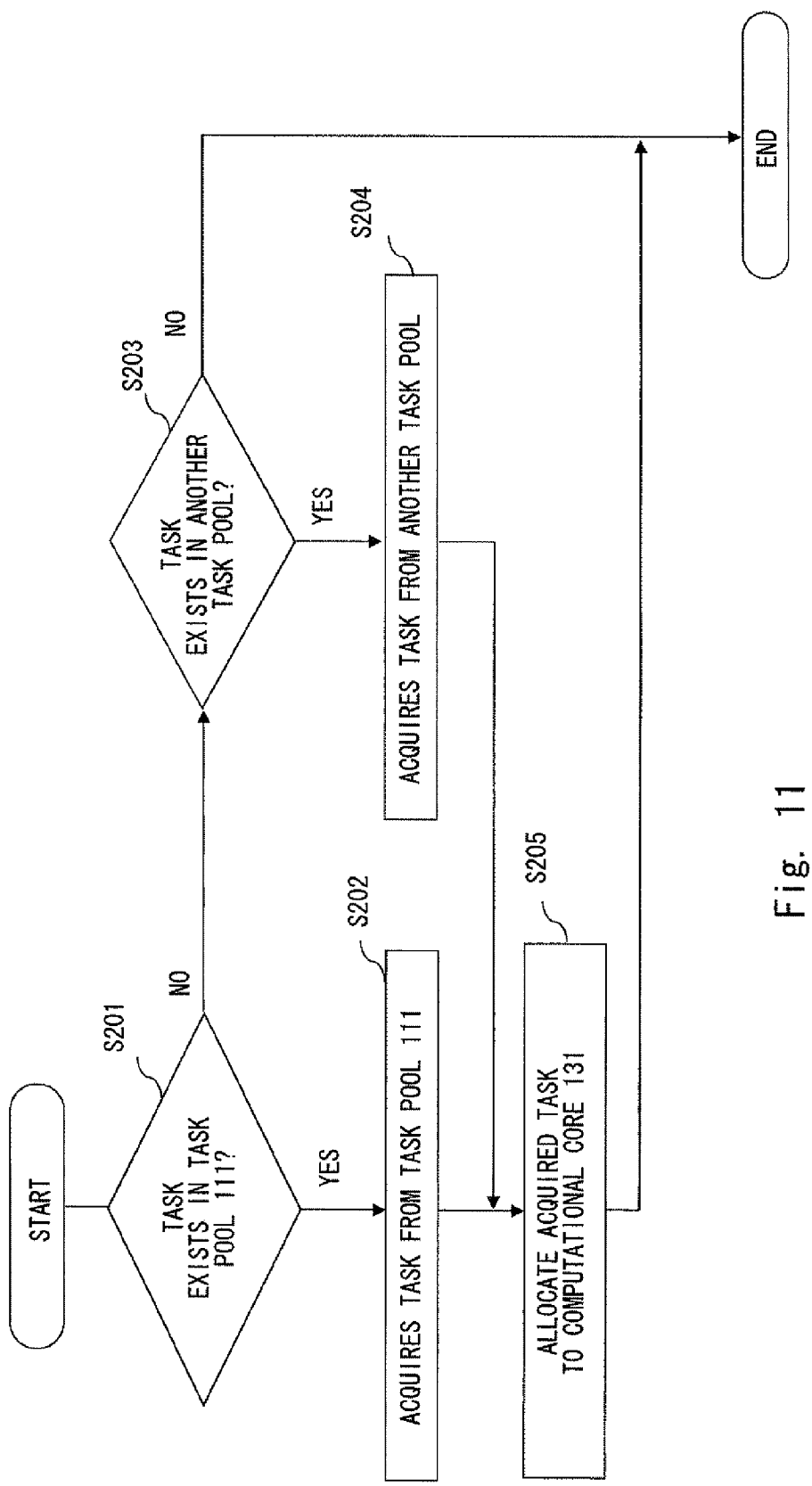
FIG. 11 is a flowchart showing an operation of acquiring a task from a task pool and allocating it to a core.
Figure 12:
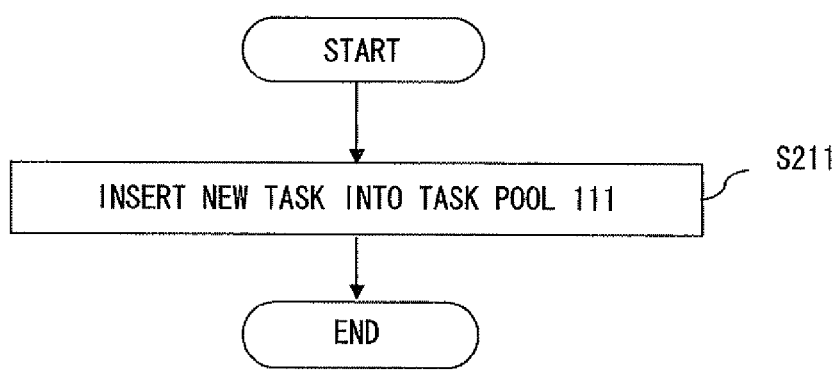
FIG. 12 is a view showing an operation of inserting a task into a task pool.
Figure 13A:
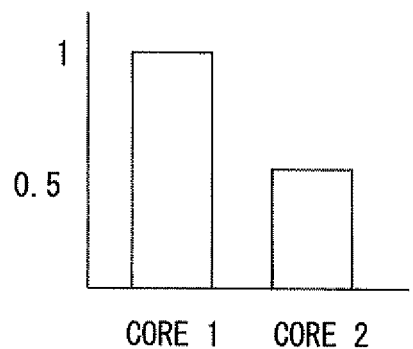
FIG. 13A is a view showing a heterostructure viewed from a parallel program.
Figure 13B:
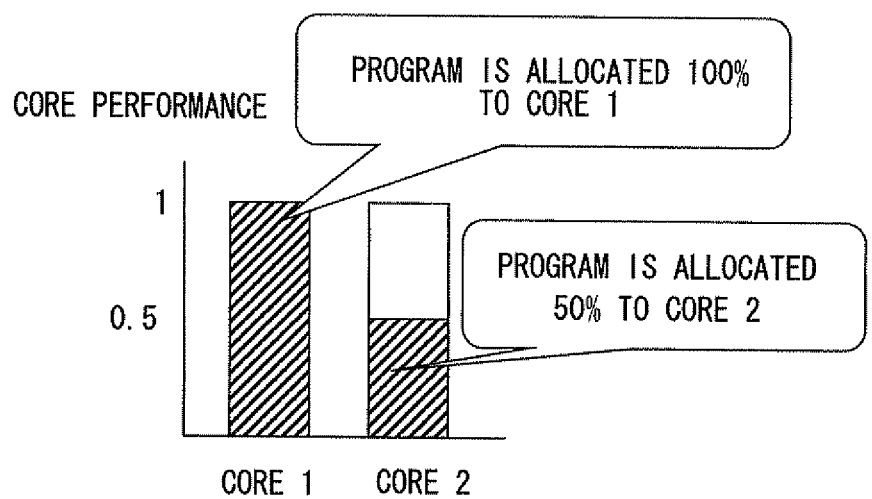
FIG. 13B is a view showing a heterostructure viewed from a parallel program.

First, the reference count analysis module 251 decodes the macroblock type and the intra prediction mode of the MB from the obtained bit stream of the MB VI to IX (Step 141). Assume that, it is found as a result of the decoding that only the MB VII is a MB which performs the intra prediction and further that it makes an upward reference (FIG. 9B). Thus, the MB task V is not referred to by any MB task and the reference count is 0. In this case, the reference count of the MB task VI is 1.

Next, the scheduler 121 decides a task pool into which the MB task V is to be inserted on the basis of the obtained reference count of the MB task V (Step 142). For example, when a threshold for the reference count determination is 1, it is decided that the MB task V is to be inserted into the task pool for the low-performance core.

The scheduler 121 inserts the MB task V into the task pool for the low-performance core (Step 143). Because the MB task VI has the reference count 1, it is inserted into the task pool for the high-performance core (FIG. 9B).

In the above-described case, it is written to perform the precedent decoding of the macroblock type and the intra prediction mode of the related MB at every task generation. However, a result of the decoding performed previously may be used without performing the precedent decoding every time. For example, a result of the precedent decoding of the MB VII which has been performed at the time of allocating the MB task VI may be used at the time of allocating the MB task V.

As described above, by performing the precedent fast decoding of only the encoding parameters necessary for deciding a reference relation from a bit stream of a related MB task, the reference count of a MB task of interest can be decided before all related tasks are generated, and the task allocation can be thereby done effectively. It is thus possible to reduce wasteful task allocation in which a high-performance core waits for a processing result of a low-performance core and thereby enhance the parallel performance.

Note that the exemplary embodiment is described by taking decoding of H.264 format as an example of video processing, the present invention is not limited to decoding of H.264 format and is also applicable to video decoding and encoding of MPEG, JPEG, VC-1 and the like.

It should be noted that the above-described exemplary embodiments are preferred exemplary embodiments of the present invention, and various changes and modifications may be made without departing from the scope of the present invention.

INDUSTRIAL APPLICABILITY

The present invention is applicable to processing of decoding video data in H.264/MPEG-4 AVC format, for example. Further, the present invention is also applicable to various systems in which data encoding is necessary, not limited to video processing.

REFERENCE SIGNS LIST

100, 200, 300 TASK ALLOCATION DEVICE
111, 112 TASK POOL
121 SCHEDULER
131, 132 COMPUTATIONAL CORE
251 REFERENCE COUNT ANALYSIS MODULE

The invention claimed is:

1. A task allocation device comprising:
a multi-core processor including a plurality of computational cores with different running performance;
a task pool that stores executable tasks, the task pool being placed for each of the computational cores;
a task scheduler configured to insert a new task into the task pool and acquire a task from the task pool; and
a reference count analysis module configured to calculate a reference count of a task, the reference count indicating a number of other tasks that refer to a processing result of the task, wherein:
the reference count analysis module is configured to:
calculate the reference count of a task newly inserted into the task pool or the reference count of a task existing in the task pool, based on the other tasks currently being executed or the other tasks already done, while other preceding tasks are executed by the computational cores,
acquire hint information and a reference count estimation method from a running task, and
estimate the reference count from the hint information based on the reference count estimation method; and
the task scheduler is configured to insert or acquire the task into or from the task pool based on the reference count calculated by the reference count analysis module.

2. The task allocation device according to claim 1, wherein
the tasks are createa by dividing video encoding or decoding in units or macroblocks, and
the reference count analysis module is configured to acquire a bit stream of a relevant macroblock as the hint information, acquire a method of decoding only encoding parameters such as a macroblock type, a screen prediction mode and a filter parameter from the bit stream as the reference count estimation method, and estimate the reference count from the encoding parameters.

3. A task allocation method comprising:

calculating a reference count of a task newly inserted into a task pool or the reference count of a task existing in a task pool, based on other tasks currently being executed or other tasks already done, while other preceding tasks are executed by computational cores, the reference count indicating a number of the other tasks that refer to a processing result of the task;

acquiring hint information and a reference count estimation method from a running task;

estimating the reference count from the hint information based on the reference count estimation method; and performing insertion of a task into the task pool and acquisition of a task from the task pool based on the calculated reference count.

4. The task allocation method according to claim 3, wherein the tasks are created by dividing video encoding or decoding in units of macroblocks, the hint information is a bit stream of a relevant macroblock, and the reference count estimation method is to decode only encoding parameters such as a macroblock type, a screen prediction mode and a filter parameter from the bit stream and estimate the reference count from the encoding parameters.

5. A non-transitory computer readable storage medium ukringu program therein, the program being executed by a computer to cause the computer to execute processing comprising:

calculating a reference count of a task newly inserted into a task pool or the reference count of a task existing in a task pool, based on other tasks currently being executed or other tasks already done, while other preceding tasks are executed by computational cores, the reference count indicating a number of the other tasks that refer to a processing result of the task, acquiring hint information and a reference count estimation method from a running task, estimating the reference count from the hint information based on the reference count estimation method; and performing insertion of a task into the task pool and acquisition of a task from the task pool based on the calculated reference count.

6. The non-transitory computer readable storage medium storing the program according to claim 5, wherein:

the tasks are created by dividing video encoding or decoding in units of macroblocks, the hint information is a bit stream of a relevant macroblock, and the reference count estimation method is to decode only encoding parameters such as a macroblock type, a screen prediction mode and a filter parameter from the bit stream and estimate the reference count from the encoding parameters.

* * * * *